United States Patent
Shi et al.

(10) Patent No.: US 9,838,073 B2
(45) Date of Patent: Dec. 5, 2017

(54) PROCESSING METHOD BASED ON OFDM-TDMA TWO-WAY SERVICE AND COMMUNICATIONS DEVICE

(71) Applicant: Huawei Technologies Co., Ltd., Shenzhen (CN)

(72) Inventors: Cao Shi, Shenzhen (CN); Zhong Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 14/570,983

(22) Filed: Dec. 15, 2014

(65) Prior Publication Data

US 2015/0098373 A1   Apr. 9, 2015

Related U.S. Application Data

(63) Continuation of application No. PCT/CN2012/077248, filed on Jun. 20, 2012.

(51) Int. Cl.
 H04B 7/208   (2006.01)
 H04B 3/20    (2006.01)
 (Continued)

(52) U.S. Cl.
 CPC ............ *H04B 3/20* (2013.01); *H04L 5/0007* (2013.01); *H04L 5/0037* (2013.01);
 (Continued)

(58) Field of Classification Search
 CPC .......... H04B 3/20; H04L 5/143; H04L 5/0037
 (Continued)

(56) References Cited

U.S. PATENT DOCUMENTS

| 7,672,447 B1 | 3/2010 | Lindqvist et al. |
| 2004/0142700 A1 | 7/2004 | Marinier |

(Continued)

FOREIGN PATENT DOCUMENTS

| CN | 1213470 A | 4/1999 |
| CN | 1602594 A | 3/2005 |

(Continued)

OTHER PUBLICATIONS

Rohling, H., et al., "Performance of an OFDM-TDMA Mobile Communication System," IEEE 46th Vehicular Technology Conference 1996. Mobile Technology for the Human Race (vol. 3); published Apr. 28, 1996, pp. 1589-1593.

(Continued)

*Primary Examiner* — Ricky Ngo
*Assistant Examiner* — Wei-Po Kao
(74) *Attorney, Agent, or Firm* — Slater Matsil, LLP (57) ABSTRACT

The present invention provides a processing method based on an OFDM-TDMA two-way service and a communications device. The method includes assigning timeslots in a TDMA frame structure to multiple users in a TDMA manner, so that each user has a different timeslot, and each timeslot of the users is simultaneously used for uplink and downlink communication. The methods further includes simultaneously sending a local-end OFDM signal and receiving a remote-end OFDM signal in each timeslot of the users, and cancelling, in an OSD manner, interference caused by an echo OFDM signal, which is produced according to the local-end OFDM signal, to the remote-end OFDM signal, where a spectrum of the echo OFDM signal and a spectrum of the remote-end OFDM signal overlap.

16 Claims, 4 Drawing Sheets

(51) Int. Cl.
*H04L 5/00* (2006.01)
*H04L 5/14* (2006.01)
*H04L 27/26* (2006.01)

(52) U.S. Cl.
CPC ............ *H04L 5/0044* (2013.01); *H04L 5/143* (2013.01); *H04L 5/1461* (2013.01); *H04L 27/2647* (2013.01)

(58) Field of Classification Search
USPC ................................................ 370/310–350
See application file for complete search history.

(56) References Cited

U.S. PATENT DOCUMENTS

| | | | |
|---|---|---|---|
| 2005/0063323 A1 | 3/2005 | Schenk | |
| 2005/0129223 A1 | 6/2005 | Piket et al. | |
| 2009/0135945 A1 | 5/2009 | Lee et al. | |
| 2010/0284445 A1 | 11/2010 | Barriac et al. | |
| 2011/0170473 A1* | 7/2011 | Proctor, Jr. | H04B 7/15585 370/315 |
| 2011/0228742 A1* | 9/2011 | Honkasalo | H04L 5/0007 370/330 |
| 2012/0015603 A1* | 1/2012 | Proctor, Jr. | H01Q 21/28 455/9 |

FOREIGN PATENT DOCUMENTS

| | | |
|---|---|---|
| CN | 1671161 A | 9/2005 |
| CN | 2826838 Y | 10/2006 |
| CN | 101202566 A | 6/2008 |
| CN | 101312372 A | 11/2008 |
| CN | 101388873 A | 3/2009 |
| CN | 101447965 A | 6/2009 |
| CN | 201332396 Y | 10/2009 |
| CN | 101895331 A | 11/2010 |
| GB | 2485387 A | 5/2012 |
| WO | 9734378 A2 | 9/1997 |
| WO | 03107558 A1 | 12/2003 |

OTHER PUBLICATIONS

European Office Action for Application No. 12 879 318.9, dated Jan. 4, 2016, 6 pages.

* cited by examiner

PROCESSING METHOD BASED ON OFDM-TDMA TWO-WAY SERVICE AND COMMUNICATIONS DEVICE

This application is a continuation of International Application No. PCT/CN2012/077248, filed on Jun. 20, 2012, which is hereby incorporated by reference in its entirety.

TECHNICAL FIELD

The present invention relates to communications technologies, and, in particular, to a processing method based on an OFDM-TDMA two-way service and a communications device.

BACKGROUND

In a communications system, a multiple access manner allows multiple mobile users to simultaneously share limited spectrum resources. Frequency Division Multiple Access (FDMA for short), Time Division Multiple Access (TDMA for short), and Code Division Multiple Access (CDMA for short) are three major access technologies for sharing effective bandwidth in a communications system. A combination of an orthogonal frequency division multiplexing technology (OFDM for short) and a multiple access technology can allow multiple users to simultaneously share limited spectrums, so as to obtain a relatively high system capacity.

At present, in an orthogonal frequency division multiplexing-Time Division Multiple Access (OFDM-TDMA) technology, a two-way service is mainly implemented in a time division duplex (TDD for short) manner, that is, communication from a remote end to a local end is performed in some timeslots, and communication from the local end to the remote end is performed in other timeslots, which causes problems of low spectrum utilization and increased overheads for uplink and downlink scheduling.

SUMMARY

The present invention provides a processing method based on an OFDM-TDMA two-way service, a device, and a communications system, to solve problems that spectrum utilization is low and overheads for scheduling at a local end are increased because in the prior art, a two-way service in OFDM-TDMA is implemented in a TDD manner.

A first aspect of the present invention provides a processing method based on an OFDM-TDMA two-way service. The processing method includes assigning timeslots in a TDMA frame structure to multiple users in a TDMA manner, so that each user has a different timeslot, and each timeslot of the users is simultaneously used for uplink and downlink communication. The processing method further includes simultaneously sending a local-end OFDM signal and receiving a remote-end OFDM signal in each timeslot of the users, and cancelling, in an OSD manner, interference caused by an echo OFDM signal, which is produced according to the local-end OFDM signal, to the remote-end OFDM signal, where a spectrum of the echo OFDM signal and a spectrum of the remote-end OFDM signal overlap.

Another aspect of the present invention provides a processing method based on an OFDM-TDMA two-way service. The processing method includes simultaneously sending a local-end OFDM signal and receiving a remote-end OFDM signal in an obtained assigned timeslot. The processing method further includes cancelling, in an OSD manner, interference caused by an echo OFDM signal, which is produced according to the local-end OFDM signal, to the remote-end OFDM signal, where a spectrum of the echo OFDM signal and a spectrum of the remote-end OFDM signal overlap.

Still another aspect of the present invention provides a communications device. A timeslot assignment module is configured to assign timeslots in a TDMA frame structure to multiple users in a TDMA manner, so that each user has a different timeslot, and each timeslot of the users is simultaneously used for uplink and downlink communication. A receiving and sending module is configured to simultaneously send a local-end OFDM signal and receive a remote-end OFDM signal in each timeslot of the users. An interference processing module is configured to cancel, in an OSD manner, interference caused by an echo OFDM signal, which is produced according to the local-end OFDM signal, to the remote-end OFDM signal. A spectrum of the echo OFDM signal and a spectrum of the remote-end OFDM signal overlap.

Yet another aspect of the present invention provides a user equipment. A receiving and sending module is configured to simultaneously send a local-end OFDM signal and receive a remote-end OFDM signal in an obtained assigned timeslot. An interference processing module is configured to cancel, in an OSD manner, interference caused by an echo OFDM signal, which is produced according to the local-end OFDM signal, to the remote-end OFDM signal. A spectrum of the echo OFDM signal and a spectrum of the remote-end OFDM signal overlap.

Technical effects of the present invention are as follows. Because access by multiple users is implemented in a TDMA manner, sending of a local-end OFDM signal and receiving of a remote-end OFDM signal can be simultaneously performed in each timeslot of the users. Therefore, interference caused by an echo OFDM signal, which is produced by the local-end OFDM signal, to the remote-end OFDM signal needs to be cancelled in an OSD manner, where a spectrum of the echo OFDM signal and a spectrum of the remote-end OFDM signal overlap, so that the local-end OFDM signal and the remote-end OFDM signal can be completely multiplexed on all frequency bands at the same time, thereby effectively improving spectrum utilization and reducing overheads for uplink and downlink scheduling.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
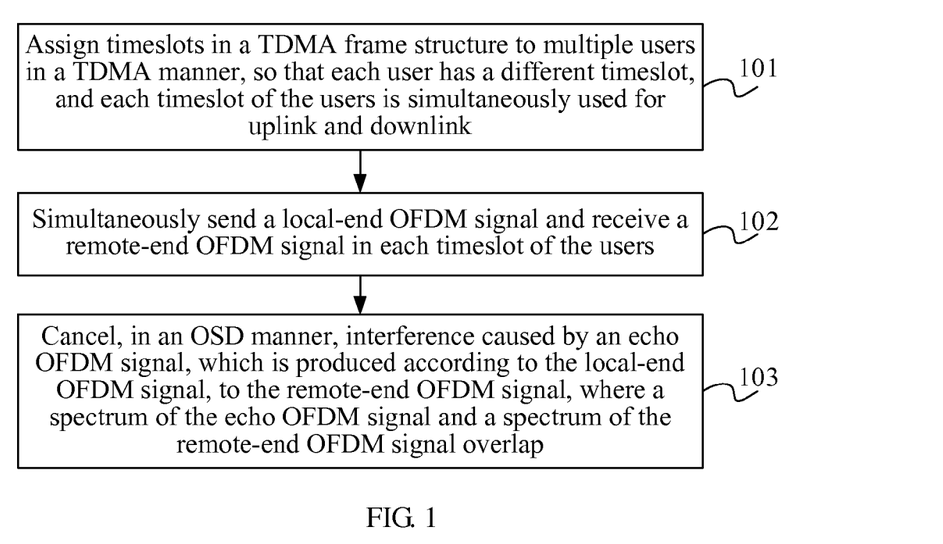
FIG. 1 is a flowchart of an embodiment of a processing method based on an OFDM-TDMA two-way service according to the present invention.

FIG. 1 is a flowchart of an embodiment of a processing method based on an OFDM-TDMA two-way service according to the present invention. As shown in FIG. 1, this embodiment may be executed by a communications device, such as a base station or a media access device. The method includes the following steps.

Step 101: Assign timeslots in a TDMA frame structure to multiple users in a TDMA manner, so that each user has a different timeslot, and each timeslot of the users is simultaneously used for uplink and downlink communication.

In a TDMA frame structure, one TDMA frame includes several subframes, and one subframe includes several timeslots. Specifically, all or a part of timeslots in the TDMA frame structure may be assigned to multiple users according to data traffic needed by the users, so that each user has a different timeslot, thereby ensuring that signals of the users do not interfere with each other. Besides, a TDMA manner is used, so that uplink communication and downlink communication can be simultaneously performed in each timeslot of the users.

Step 102: Simultaneously send a local-end OFDM signal and receive a remote-end OFDM signal in each timeslot of the users.

In this embodiment, because the TDMA manner is used, uplink communication and downlink communication, that is, sending of the local-end OFDM signal and receiving of the remote-end OFDM signal, can be performed simultaneously. The local-end OFDM signal is produced by a transceiver at a local end, and the remote-end OFDM signal is produced by a transceiver at a remote end and reaches a receiver at the local end after being attenuated in a channel.

Step 103: Cancel, in an overlapped spectrum duplex (OSD for short) manner, interference caused by an echo OFDM signal, which is produced according to the local-end OFDM signal, to the remote-end OFDM signal, where a spectrum of the echo OFDM signal and a spectrum of the remote-end OFDM signal overlap.

In this embodiment, because a transmitter and a receiver which are at a local end are simultaneously connected to a same medium, and simultaneously send a local-end OFDM signal and receive a remote-end OFDM signal, a spectrum of an echo OFDM signal, which returns to the receiver at the local end through a hybrid loop, of the local-end OFDM signal and a spectrum of the remote-end OFDM signal overlap. Therefore, signals received by the receiver at the local end includes the remote-end OFDM signal and the echo OFDM signal, causing interference caused by the echo OFDM signal, which is produced by the local-end OFDM signal, to the remote-end OFDM signal. Therefore, adaptive echo cancellation processing needs to be performed on the local-end OFDM signal, to cancel in real time the interference caused by the echo OFDM signal, which is produced according to the local-end OFDM signal, to the remote-end OFDM signal.

It should be noted that the local end may specifically be a communications device, and the remote end may specifically be a user equipment. In this embodiment, because access of multiple users is implemented in a TDMA manner, sending of a local-end OFDM signal and receiving of a remote-end OFDM signal can be simultaneously performed in each timeslot of the users. Therefore, interference caused by an echo OFDM signal, which is produced by the local-end OFDM signal, to the remote-end OFDM signal needs to be cancelled in an OSD manner, where spectrums of the local-end OFDM signal and the remote-end OFDM signal overlap, so that the local-end OFDM signal and the remote-end OFDM signal can be completely multiplexed on all frequency bands at the same time, thereby effectively improving spectrum utilization and reducing overheads for uplink and downlink scheduling.

Figure 2:
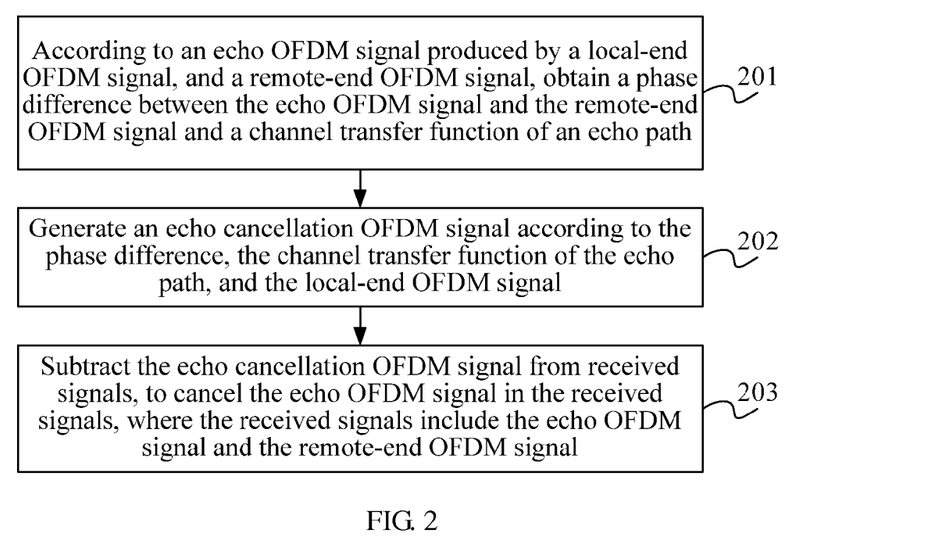
FIG. 2 is a flowchart of another embodiment of a processing method based on an OFDM-TDMA two-way service according to the present invention.

FIG. 2 is a flowchart of another embodiment of a processing method based on an OFDM-TDMA two-way service according to the present invention. Based on the foregoing embodiment shown in FIG. 1, preferably, the technical solution of this embodiment is described in detail by using an example that the OSD manner is a digital signal frequency domain cancellation manner. A specific implementation manner of step 103 is as follows:

Step 201: Obtain, according to the echo OFDM signal produced by the local-end OFDM signal, and the remote-end OFDM signal, a phase difference between the echo OFDM signal and the remote-end OFDM signal and a channel transfer function of an echo path.

Step 202: Generate an echo cancellation OFDM signal according to the phase difference, the channel transfer function of the echo path, and the local-end OFDM signal.

Step 203: Subtract the echo cancellation OFDM signal from received signals, to cancel the echo OFDM signal in the received signals, where the received signals include the echo OFDM signal and the remote-end OFDM signal.

In this embodiment, specifically, the echo OFDM signal is cancelled by using a principle of cancellation by superimposing opposite phases of the echo cancellation OFDM signal and the echo OFDM signal.

Figure 3:
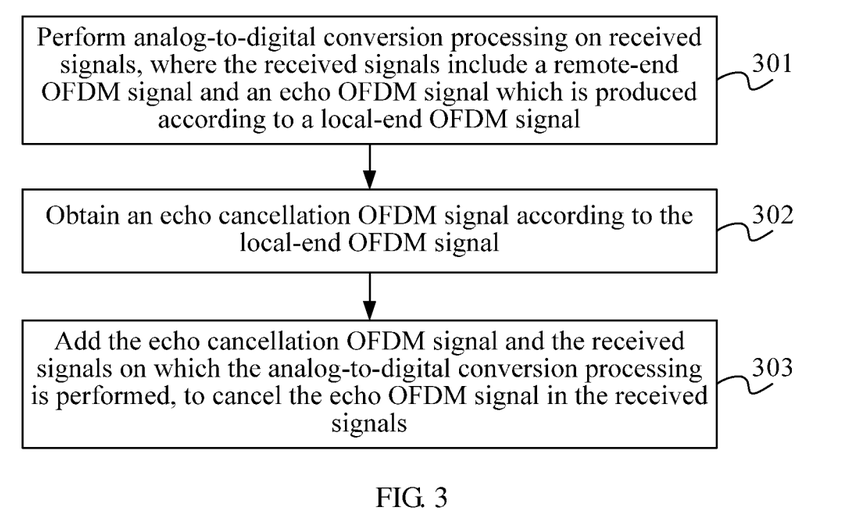
FIG. 3 is a flowchart of still another embodiment of a processing method based on an OFDM-TDMA two-way service according to the present invention.

FIG. 3 is a flowchart of still another embodiment of a processing method based on an OFDM-TDMA two-way service according to the present invention. Based on the foregoing embodiment shown in FIG. 1, preferably, the technical solution of this embodiment is described in detail by using an example that the OSD manner is a digital signal time domain cancellation manner. A specific implementation manner of step 103 is as follows:

Step 301: Perform analog-to-digital conversion processing on received signals, where the received signals include the remote-end OFDM signal and the echo OFDM signal which is produced according to the local-end OFDM signal.

Step 302: Obtain an echo cancellation OFDM signal according to the local-end OFDM signal.

Step 303: Add the echo cancellation OFDM signal and the received signals on which the analog-to-digital conversion processing is performed, to cancel the echo OFDM signal in the received signals.

Figure 4:
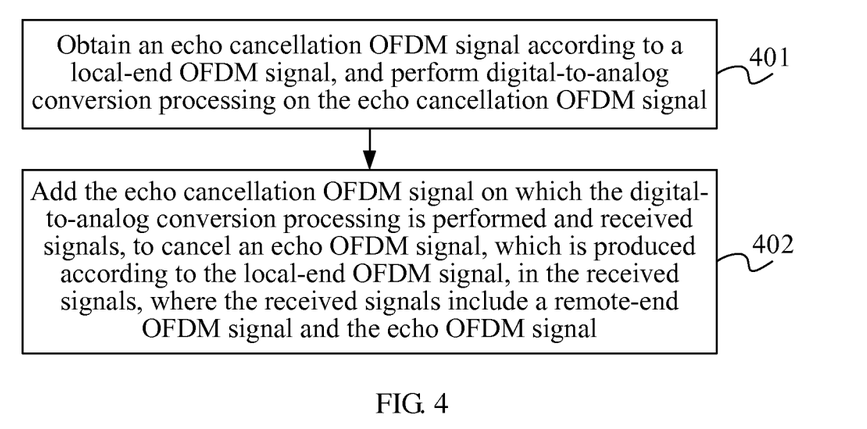
FIG. 4 is a flowchart of yet another embodiment of a processing method based on an OFDM-TDMA two-way service according to the present invention.

FIG. 4 is a flowchart of another embodiment of a processing method based on an OFDM-TDMA two-way service according to the present invention. Based on the foregoing embodiment shown in FIG. 1, preferably, the technical solution of this embodiment is described in detail by using an example that the OSD manner is an analog signal time domain cancellation manner. A specific implementation manner of step 103 is as follows:

Step 401: Obtain an echo cancellation OFDM signal according to the local-end OFDM signal, and perform digital-to-analog conversion processing on the echo cancellation OFDM signal.

Step 402: Add the echo cancellation OFDM signal on which the digital-to-analog conversion processing is performed and received signals, to cancel the echo OFDM signal, which is produced according to the local-end OFDM signal, in the received signals, where the received signals include the remote-end OFDM signal and the echo OFDM signal.

Figure 5:
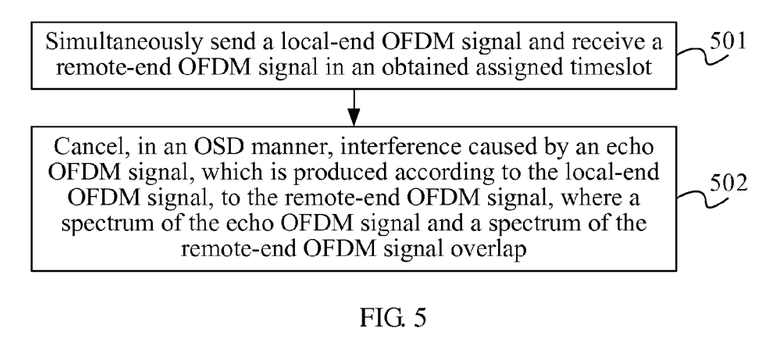
FIG. 5 is a flowchart of yet another embodiment of a processing method based on an OFDM-TDMA two-way service according to the present invention.

FIG. 5 is a flowchart of yet another embodiment of a processing method based on an OFDM-TDMA two-way service according to the present invention. As shown in FIG. 5, this embodiment may be executed by a user equipment. The method includes:

Step 501: Simultaneously send a local-end OFDM signal and receive a remote-end OFDM signal in an obtained assigned timeslot.

In this embodiment, a communications device may assign all timeslots in a TDMA frame structure to multiple users, so that each user has a different timeslot. In a TDMA frame structure, one TDMA frame includes several subframes, and one subframe includes several timeslots.

Step 502: Cancel, in an OSD manner, interference caused by an echo OFDM signal, which is produced according to the local-end OFDM signal, to the remote-end OFDM signal, where a spectrum of the echo OFDM signal and a spectrum of the remote-end OFDM signal overlap.

In this embodiment, the local-end OFDM signal is produced by a transceiver at a local end, and the remote-end OFDM signal is produced by a transceiver at a remote end and reaches a receiver at the local end after being attenuated in a channel.

In this embodiment, because a transmitter and a receiver which are at a local end are simultaneously connected to a same medium and simultaneously send a local-end OFDM signal and receive a remote-end OFDM signal, a spectrum of an echo OFDM signal, which returns to the receiver at the local end through a hybrid loop, of the local-end OFDM signal and a spectrum of the remote-end OFDM signal nearly completely overlap. Therefore, signals received by the receiver at the local end include the remote-end OFDM signal and the echo OFDM signal, causing interference caused by the echo OFDM signal, which is produced by the local-end OFDM signal, to the remote-end OFDM signal. Therefore, adaptive echo cancellation processing needs to be performed on the local-end OFDM signal, to cancel in real time the interference caused by the echo OFDM signal, which is produced according to the local-end OFDM signal, to the remote-end OFDM signal.

It should be noted that the local end may specifically be a user equipment, and the remote end may specifically be a communications device.

In this embodiment, because access of multiple users is implemented in a TDMA manner, sending of a local-end OFDM signal and receiving of a remote-end OFDM signal can be performed simultaneously in an obtained assigned timeslot. Besides, interference caused by an echo OFDM signal, which is produced by the local-end OFDM signal, to the remote-end OFDM signal is cancelled in an OSD manner, where a spectrum of the echo OFDM signal and a spectrum of the remote-end OFDM signal overlap, so that the local-end OFDM signal and the remote-end OFDM signal can be completely multiplexed on all frequency bands at the same time, thereby effectively improving spectrum utilization and reducing overheads for uplink and downlink scheduling.

Further, in another embodiment of the present invention, based on the foregoing embodiment shown in FIG. 5, step 502 mainly has the following implementation manners.

The first manner is as follows. Assuming that the OSD manner is a digital signal frequency domain cancellation manner, a specific implementation manner of step 502 includes obtaining, according to the echo OFDM signal produced by the local-end OFDM signal, and the remote-end OFDM signal, a phase difference between the echo OFDM signal and the remote-end OFDM signal and a channel transfer function of an echo path. Step 502 further includes generating an echo cancellation OFDM signal according to the phase difference, the channel transfer function of the echo path, and the local-end OFDM signal, and subtracting the echo cancellation OFDM signal from received signals, to cancel the echo OFDM signal in the received signals, where the received signals include the echo OFDM signal and the remote-end OFDM signal.

In this embodiment, specifically, the echo OFDM signal is cancelled by using a principle of cancellation by superimposing opposite phases of the echo cancellation OFDM signal and the echo OFDM signal.

The second manner is as follows. Assuming that the OSD manner is a digital signal time domain cancellation manner, a specific implementation manner of step 502 includes performing analog-to-digital conversion processing on received signals, where the received signals include the remote-end OFDM signal and the echo OFDM signal which is produced according to the local-end OFDM signal. Step 502 further includes obtaining an echo cancellation OFDM signal according to the local-end OFDM signal, and adding the echo cancellation OFDM signal and the received signals on which the analog-to-digital conversion processing is performed, to cancel the echo OFDM signal in the received signals.

The third manner is as follows. Assuming that the OSD manner is an analog signal time domain cancellation manner, a specific implementation manner of step 502 includes obtaining an echo cancellation OFDM signal according to the local-end OFDM signal, and performing digital-to-analog conversion processing on the echo cancellation OFDM signal. Step 502 further includes adding the echo cancellation OFDM signal on which the digital-to-analog conversion processing is performed and received signals, to cancel the echo OFDM signal, which is produced according to the local-end OFDM signal, in the received signals, where the received signals include the remote-end OFDM signal and the echo OFDM signal.

Figure 6:
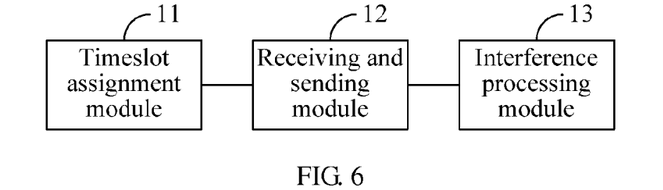
FIG. 6 is a schematic structural diagram of an embodiment of a communications device according to the present invention.

FIG. 6 is a schematic structural diagram of an embodiment of a communications device according to the present invention. As shown in FIG. 6, the communications device in this embodiment includes: a timeslot assignment module 11, a receiving and sending module 12, and an interference processing module 13. The timeslot assignment module 11 is configured to assign timeslots in a TDMA frame structure to multiple users in a TDMA manner, so that each user has a different a timeslot, and each timeslot of the users is simultaneously used for uplink and downlink communication. The receiving and sending module 12 is configured to simultaneously send a local-end OFDM signal and receive a remote-end OFDM signal in each timeslot of the users. The interference processing module 13 is configured to cancel, in an OSD manner, interference caused by an echo OFDM signal, which is produced according to the local-end OFDM signal, to the remote-end OFDM signal, where a spectrum of the echo OFDM signal and a spectrum of the remote-end OFDM signal overlap.

The communications device in this embodiment may execute the technical solution of the method embodiment shown in FIG. 1, and an implementation principle is similar to that of the method embodiment, which is not described repeatedly herein.

In this embodiment, because access of multiple users is implemented in a TDMA manner, sending of a local-end OFDM signal and receiving of a remote-end OFDM signal can be simultaneously performed in each timeslot of the users. Therefore, interference caused by an echo OFDM signal, which is produced by the local-end OFDM signal, to the remote-end OFDM signal needs to be cancelled in an OSD manner, where a spectrum of the echo OFDM signal and a spectrum of the remote-end OFDM signal overlap, so that the local-end OFDM signal and the remote-end OFDM signal can be completely multiplexed on all frequency bands at the same time, thereby effectively improving spectrum utilization and reducing overheads for uplink and downlink scheduling.

Figure 7:
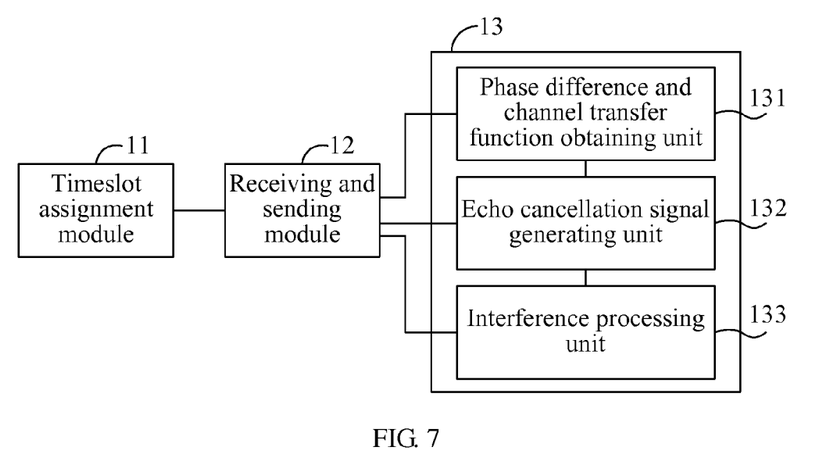
FIG. 7 is a schematic structural diagram of another embodiment of a communications device according to the present invention.

Further, FIG. 7 is a schematic structural diagram of another embodiment of a communications device according to the present invention. As shown in FIG. 7, based on the foregoing embodiment shown in FIG. 6, preferably, the technical solution of this embodiment is described in detail by using an example that the OSD manner is a digital signal frequency domain cancellation manner. The interference processing module 13 includes a phase difference and channel transfer function obtaining unit 131, an echo cancellation signal generating unit 132, and an interference processing unit 133. The phase difference and channel transfer function obtaining unit 131 is configured to obtain, according to the echo OFDM signal produced by the local-end OFDM signal, and the remote-end OFDM signal, a phase difference between the echo OFDM signal and the remote-end OFDM signal and a channel transfer function of an echo path. The echo cancellation signal generating unit 132 is configured to generate an echo cancellation OFDM signal according to the phase difference, the channel transfer function of the echo path, and the local-end OFDM signal. The interference processing unit 133 is configured to subtract the echo cancellation OFDM signal from received signals, to cancel the echo OFDM signal in the received signals, where the received signals include the echo OFDM signal and the remote-end OFDM signal.

Figure 8:
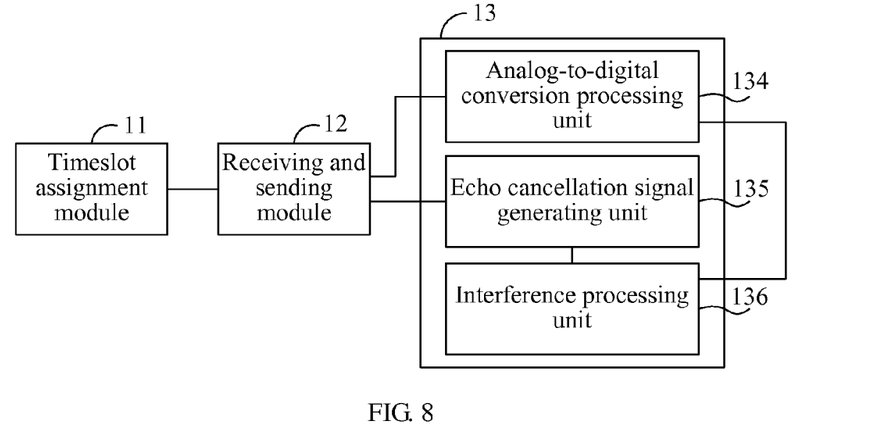
FIG. 8 is a schematic structural diagram of still another embodiment of a communications device according to the present invention.

Still further, FIG. 8 is a schematic structural diagram of still another embodiment of a communications device according to the present invention. As shown in FIG. 8, based on the foregoing embodiment shown in FIG. 6, preferably, the technical solution of this embodiment is described in detail by using an example that the OSD manner is a digital signal time domain cancellation manner. The interference processing module 13 includes an analog-to-digital conversion processing unit 134, an echo cancellation signal generating unit 135, and an interference processing unit 136. The analog-to-digital conversion processing unit 134 is configured to perform analog-to-digital conversion processing on received signals, where the received signals include the remote-end OFDM signal and the echo OFDM signal which is produced according to the local-end OFDM signal. The echo cancellation signal generating unit 135 is configured to obtain an echo cancellation OFDM signal according to the local-end OFDM signal. The interference processing unit 136 is configured to add the echo cancellation OFDM signal and the received signals on which the analog-to-digital conversion processing is performed, to cancel the echo OFDM signal in the received signals.

Figure 9:
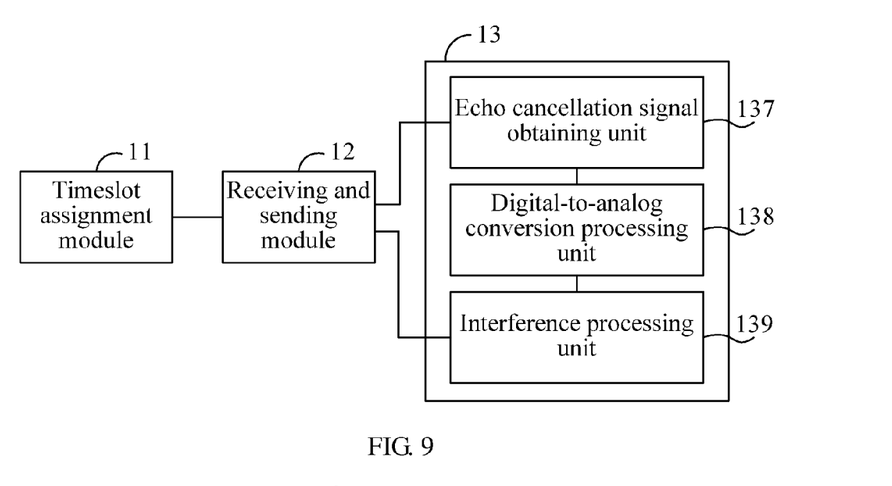
FIG. 9 is a schematic structural diagram of yet another embodiment of a communications device according to the present invention.

Still further, FIG. 9 is a schematic structural diagram of yet another embodiment of a communications device according to the present invention. As shown in FIG. 9, based on the foregoing embodiment shown in FIG. 6, preferably, the technical solution of this embodiment is described in detail by using an example that the OSD manner is an analog signal time domain cancellation manner. The interference processing module 13 includes an echo cancellation signal obtaining unit 137, a digital-to-analog conversion processing unit 138, and an interference processing unit 139. The echo cancellation signal obtaining unit 137 is configured to obtain an echo cancellation OFDM signal according to the local-end OFDM signal. The digital-to-analog conversion processing unit 138 is configured to perform digital-to-analog conversion processing on the echo cancellation OFDM signal. The interference processing unit 139 is configured to add the echo cancellation OFDM signal on which the digital-to-analog conversion processing is performed and received signals, to cancel the echo OFDM signal, which is produced according to the local-end OFDM signal, in the received signals, where the received signals include the remote-end OFDM signal and the echo OFDM signal.

Figure 10:
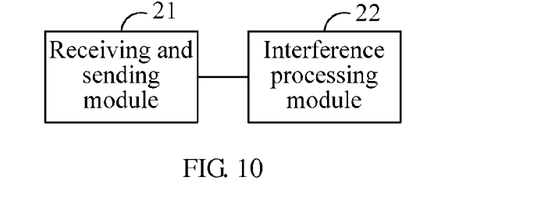
FIG. 10 is a schematic structural diagram of an embodiment of a user equipment according to the present invention.

FIG. 10 is a schematic structural diagram of an embodiment of a user equipment according to the present invention. As shown in FIG. 10, the user equipment in this embodiment includes: a receiving and sending module 21 and an interference processing module 22. The receiving and sending module 21 is configured to simultaneously send a local-end OFDM signal and receive a remote-end OFDM signal in an obtained assigned timeslot. The interference processing module 22 is configured to cancel, in an OSD manner, interference caused by an echo OFDM signal, which is produced according to the local-end OFDM signal, to the remote-end OFDM signal, where a spectrum of the echo OFDM signal and a spectrum of the remote-end OFDM signal overlap.

The user equipment in this embodiment may execute the technical solution of the method embodiment shown in FIG. 5, and an implementation principle is similar to that of the method embodiment, which is not described repeatedly herein.

In this embodiment, because access of multiple users is implemented in a TDMA manner, sending of a local-end OFDM signal and receiving of a remote-end OFDM signal can be simultaneously performed in an obtained assigned timeslot. Therefore, interference caused by an echo OFDM signal, which is produced by the local-end OFDM signal, to the remote-end OFDM signal needs to be cancelled in an OSD manner, where spectrums of the local-end OFDM signal and the remote-end OFDM signal overlap, so that the local-end OFDM signal and the remote-end OFDM signal can be completely multiplexed on all frequency bands at the same time, thereby effectively improving spectrum utilization and reducing overheads for uplink and downlink scheduling.

Further, in another embodiment of the present invention, based on the foregoing embodiment shown in FIG. 10, preferably, the technical solution of this embodiment is described in detail by using an example that the OSD manner is a digital signal frequency domain cancellation manner. The interference processing module 22 includes a phase difference and channel transfer function obtaining unit, an echo cancellation signal generating unit, and an interference processing unit. The phase difference and channel transfer function obtaining unit is configured to obtain, according to the echo OFDM signal produced by the local-end OFDM signal, and the remote-end OFDM signal, a phase difference between the echo OFDM signal and the remote-end OFDM signal and a channel transfer function of an echo path. The echo cancellation signal generating unit is configured to generate an echo cancellation OFDM signal according to the phase difference, the channel transfer function of the echo path, and the local-end OFDM signal. The interference processing unit is configured to subtract the echo cancellation OFDM signal from received signals, to cancel the echo OFDM signal in the received signals, where the received signals include the echo OFDM signal and the remote-end OFDM signal.

Still further, in still another embodiment of the present invention, based on the foregoing embodiment shown in FIG. 6, preferably, the technical solution of this embodiment is described in detail by using an example that the OSD manner is a digital signal time domain cancellation manner. The interference processing module 22 includes an analog-to-digital conversion processing unit, an echo cancellation signal generating unit, and an interference processing unit. The analog-to-digital conversion processing unit is configured to perform analog-to-digital conversion processing on received signals, where the received signals include the remote-end OFDM signal and the echo OFDM signal which is produced according to the local-end OFDM signal. The echo cancellation signal generating unit is configured to obtain an echo cancellation OFDM signal according to the local-end OFDM signal. The interference processing unit is configured to add the echo cancellation OFDM signal and the received signals on which the analog-to-digital conversion processing is performed, to cancel the echo OFDM signal in the received signals.

Still further, in yet another embodiment of the present invention, based on the foregoing embodiment shown in FIG. 6, preferably, the technical solution of this embodiment is described in detail by using an example that the OSD manner is an analog signal time domain cancellation manner. The interference processing module 22 includes an echo cancellation signal obtaining unit, a digital-to-analog conversion processing unit, and an interference processing unit. The echo cancellation signal obtaining unit is configured to obtain an echo cancellation OFDM signal according to the local-end OFDM signal. The digital-to-analog conversion processing unit is configured to perform digital-to-analog conversion processing on the echo cancellation OFDM signal. The interference processing unit is configured to add the echo cancellation OFDM signal on which the digital-to-analog conversion processing is performed and received signals, to cancel the echo OFDM signal, which is produced according to the local-end OFDM signal, in the received signals, which include the remote-end OFDM signal and the echo OFDM signal.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A processing method based on an orthogonal frequency division multiplexing Time Division Multiple Access (OFDM-TDMA) two-way service, the processing method comprising:
assigning, by a communications device, timeslots in a TDMA frame structure to multiple users in a TDMA manner, so that each user has a different timeslot, and each timeslot of the users is simultaneously used for uplink and downlink communication between a respective user and the communications device:
simultaneously sending a local-end OFDM signal to a respective user and receiving a remote-end OFDM signal from the respective user in a timeslot of the respective user by the communications device, the local-end OFDM signal and the remote-end OFDM signal being multiplexed on a same frequency spectrum at the same time: and
cancelling, by the communications device in an overlapped spectrum duplex (OSD) manner, interference caused by an echo OFDM signal, which is produced according to the local-end OFDM signal, to the remote-end OFDM signal by combining received signals with an echo cancellation OFDM signal, the echo cancellation OFDM signal being generated for cancelling the echo OFDM signal from the received signals, wherein the echo cancellation OFDM signal is generated at least in part based on a phase difference between the echo OFDM signal and the remote-end OFDM signal,
wherein the combining is only adding or subtracting,
wherein the received signals comprise the echo OFDM signal and the remote-end OFDM signal, and
wherein a spectrum of the echo OFDM signal and a spectrum of the remote-end OFDM signal overlap.

2. The processing method according to claim 1, wherein cancelling the interference caused by the echo OFDM signal comprises:
obtaining, according to the echo OFDM signal and the remote-end OFDM signal, a phase difference between the echo OFDM signal and the remote-end OFDM signal, and a channel transfer function of an echo path;
generating the echo cancellation OFDM signal according to the phase difference, the channel transfer function of the echo path, and the local-end OFDM signal; and
subtracting the echo cancellation OFDM signal from the received signals, to cancel the echo OFDM signal in the received signals.

3. The processing method according to claim 1, wherein cancelling the interference caused by the echo OFDM signal comprises:
performing analog-to-digital conversion processing on the received signals;
obtaining the echo cancellation OFDM signal according to the local-end OFDM signal; and
adding the echo cancellation OFDM signal and the received signals, on which the analog-to-digital conversion processing is performed, to cancel the echo OFDM signal in the received signals.

4. The processing method according to claim 1, wherein cancelling the interference caused by the echo OFDM signal comprises:
    obtaining the echo cancellation OFDM signal according to the local-end OFDM signal, and performing digital-to-analog conversion processing on the echo cancellation OFDM signal; and
    adding the echo cancellation OFDM signal, on which the digital-to-analog conversion processing is performed, and the received signals, to cancel the echo OFDM signal in the received signals.

5. A processing method based on an orthogonal frequency division multiplexing Time Division Multiple Access (OFDM-TDMA) two-way service, the processing method comprising:
    simultaneously sending a local-end OFDM signal to a communications device and receiving a remote-end OFDM signal from the communications device in an obtained assigned timeslot, the local-end OFDM signal and the remote-end OFDM signal being multiplexed on a same frequency spectrum at the same time: and
    cancelling, in an overlapped spectrum duplex OSD manner, interference caused by an echo OFDM signal, which is produced according to the local-end OFDM signal, to the remote-end OFDM signal by combining received signals with an echo cancellation OFDM signal, the echo cancellation OFDM signal being generated for cancelling the echo OFDM signal from the received signals, wherein the echo cancellation OFDM signal is generated at least in part based on a phase difference between the echo OFDM signal and the remote-end OFDM signal,
    wherein the combining is only adding or subtracting,
    wherein the received signals comprise the echo OFDM signal and the remote-end OFDM signal, and
    wherein a spectrum of the echo OFDM signal and a spectrum of the remote-end OFDM signal overlap.

6. The processing method according to claim 5, wherein cancelling the interference caused by the echo OFDM signal comprises:
    obtaining, according to the echo OFDM signal and the remote-end OFDM signal, a phase difference between the echo OFDM signal and the remote-end OFDM signal and a channel transfer function of an echo path;
    generating the echo cancellation OFDM signal according to the phase difference, the channel transfer function of the echo path, and the local-end OFDM signal; and
    subtracting the echo cancellation OFDM signal from the received signals, to cancel the echo OFDM signal in the received signals.

7. The processing method according to claim 5, wherein cancelling the interference caused by the echo OFDM signal comprises:
    performing analog-to-digital conversion processing on the received signals;
    obtaining the echo cancellation OFDM signal according to the local-end OFDM signal; and
    adding the echo cancellation OFDM signal and the received signals, on which the analog-to-digital conversion processing is performed, to cancel the echo OFDM signal in the received signals.

8. The processing method according to claim 5, wherein cancelling the interference caused by the echo OFDM signal comprises:
    obtaining the echo cancellation OFDM signal according to the local-end OFDM signal, and performing digital-to-analog conversion processing on the echo cancellation OFDM signal; and
    adding the echo cancellation OFDM signal, on which the digital-to-analog conversion processing is performed, and the received signals, to cancel the echo OFDM signal in the received signals.

9. A communications device, comprising:
    a processor; and
    a non-transitory computer-readable storage medium storing a program to be executed by the processor, the program including instructions for:
    assigning timeslots in a Time Division Multiple Access (TDMA) frame structure to multiple users in a TDMA manner, so that each user has a different timeslot, and each timeslot of the users is simultaneously used for uplink and downlink communication between a respective user and the communications device:
    simultaneously sending a local-end orthogonal frequency division multiplexing (OFDM) signal to a respective user and receive a remote-end OFDM signal from the respective user in a timeslot of the respective user, the local-end OFDM signal and the remote-end OFDM signal being multiplexed on a same frequency spectrum at the same time: and
    cancelling, in an overlapped spectrum duplex (OSD) manner, interference caused by an echo OFDM signal, which is produced according to the local-end OFDM signal, to the remote-end OFDM signal by combining received signals with an echo cancellation OFDM signal, the echo cancellation OFDM signal being generated for cancelling the echo OFDM signal from the received signals, wherein the echo cancellation OFDM signal is generated at least in part based on a phase difference between the echo OFDM signal and the remote-end OFDM signal,
    wherein the combining is only adding or subtracting,
    wherein the received signals comprise the echo OFDM signal and the remote-end OFDM signal, and
    wherein a spectrum of the echo OFDM signal and a spectrum of the remote-end OFDM signal overlap.

10. The communications device according to claim 9, wherein the program further includes instructions for:
    obtaining, according to the echo OFDM signal and the remote-end OFDM signal, a phase difference between the echo OFDM signal and the remote-end OFDM signal, and a channel transfer function of an echo path;
    generating the echo cancellation OFDM signal according to the phase difference, the channel transfer function of the echo path, and the local-end OFDM signal; and
    subtracting the echo cancellation OFDM signal from the received signals, to cancel the echo OFDM signal in the received signals.

11. The communications device according to claim 9, wherein the program further includes instructions for:
    performing analog-to-digital conversion processing on the received signals;
    obtaining the echo cancellation OFDM signal according to the local-end OFDM signal; and
    adding the echo cancellation OFDM signal and the received signals, on which the analog-to-digital conversion processing is performed, to cancel the echo OFDM signal in the received signals.

12. The communications device according to claim 9, wherein the program further includes instructions for:

obtaining the echo cancellation OFDM signal according to the local-end OFDM signal;
performing digital-to-analog conversion processing on the echo cancellation OFDM signal; and
adding the echo cancellation OFDM signal, on which the digital-to-analog conversion processing is performed, and the received signals, to cancel the echo OFDM signal in the received signals.

13. A user equipment, comprising:
a processor; and
a non-transitory computer-readable storage medium storing a program to be executed by the processor, the program including instructions for:
simultaneously sending a local-end orthogonal frequency division multiplexing (OFDM) signal to a communications device and receive a remote-end OFDM signal from the communications device in an obtained assigned timeslot, the local-end OFDM signal and the remote-end OFDM signal having overlapping frequency spectrum: and
cancelling, in an overlapped spectrum duplex (OSD) manner, interference caused by an echo OFDM signal, which is produced according to the local-end OFDM signal, to the remote-end OFDM signal by combining received signals with an echo cancellation OFDM signal, the echo cancellation OFDM signal being generated for cancelling the echo OFDM signal from the received signals, wherein the echo cancellation OFDM signal is generated at least in part based on a phase difference between the echo OFDM signal and the remote-end OFDM signal,
wherein the combining is only adding or subtracting,
wherein the received signals comprise the echo OFDM signal and the remote-end OFDM signal, and
wherein a spectrum of the echo OFDM signal and a spectrum of the remote-end OFDM signal overlap.

14. The user equipment according to claim 13, wherein the program further includes instructions for:
obtaining, according to the echo OFDM signal and the remote-end OFDM signal, a phase difference between the echo OFDM signal and the remote-end OFDM signal, and a channel transfer function of an echo path;
generating the echo cancellation OFDM signal according to the phase difference, the channel transfer function of the echo path, and the local-end OFDM signal; and
subtracting the echo cancellation OFDM signal from the received signals, to cancel the echo OFDM signal in the received signals.

15. The user equipment according to claim 13, wherein the program further includes instructions for:
performing analog-to-digital conversion processing on the received signals;
obtaining the echo cancellation OFDM signal according to the local-end OFDM signal;
and adding the echo cancellation OFDM signal and the received signals, on which the analog-to-digital conversion processing is performed, to cancel the echo OFDM signal in the received signals.

16. The user equipment according to claim 13, wherein the program further includes instructions for:
obtaining the echo cancellation OFDM signal according to the local-end OFDM signal;
performing digital-to-analog conversion processing on the echo cancellation OFDM signal; and
adding the echo cancellation OFDM signal, on which the digital-to-analog conversion processing is performed, and the received signals.

* * * * *